United States Patent [19]

Hoffman et al.

[11] Patent Number: 5,607,518
[45] Date of Patent: Mar. 4, 1997

[54] METHODS OF DEBLOCKING, EXTRACTING AND CLEANING POLYMERIC ARTICLES WITH SUPERCRITICAL FLUIDS

[75] Inventors: Roger J. Hoffman, Cumming; Wilson L. Terry, Jr., Alpharetta, both of Ga.

[73] Assignee: Ciba Geigy Corporation, Tarrytown, N.Y.

[21] Appl. No.: 393,107

[22] Filed: Feb. 22, 1995

[51] Int. Cl.⁶ .......................... B29C 71/00; B29D 11/00
[52] U.S. Cl. .................. 134/31; 134/37; 134/42; 264/2.6; 264/85
[58] Field of Search ................. 134/31, 34, 37, 134/42, 1, 10; 249/66.1; 264/1.32, 2.6, 85, 138

[56] References Cited

U.S. PATENT DOCUMENTS

| | | | |
|---|---|---|---|
| 3,806,619 | 4/1974 | Zosel. | |
| 4,873,218 | 5/1988 | Pekala | 502/418 |
| 4,882,107 | 11/1989 | Cavender et al. | 264/51 |
| 5,035,847 | 7/1991 | Nishio et al. | 264/86 |
| 5,306,350 | 4/1994 | Hoy et al. | 134/22.14 |
| 5,339,844 | 8/1994 | Stanford, Jr. et al. | 134/107 |
| 5,456,759 | 10/1995 | Stanford, Jr. et al. | 134/1 |

FOREIGN PATENT DOCUMENTS

| | | |
|---|---|---|
| 564396A1 | 2/1993 | European Pat. Off.. |
| 616838A1 | 3/1994 | European Pat. Off.. |
| WO9109079 | 6/1991 | WIPO. |

OTHER PUBLICATIONS

Carbon Dioxides Expanding Role, Chem Engr. 1993 Robt Steiner pp. 114–119.

Rate & Extent of Supercritical Fluid Extraction of Additives from Polypropylene: Diffusion Solubility Matrix Effects N J Cotton, et al, Journal of Appplied Polymer Science, vol. 48–1607–1619 (1993).

Pressure Products Industries, Inc., Bulletin PDU–700.

EnvironPro Technologies (Autoclave Engineering) Product Literature, "Two–Step Process, Non–aqueous Cleaning System From Autoclave Engineers".

EnvironPro Technologies (Autoclave Engineering) Product Literature, "The Natural Solution to Economical Precision Parts Cleaning and Drying".

Pressure Products Industries, Inc., Bulletin PDU–700.

*Chem. Engr.*, Internat. Ed., vol. 100, No. 3, pp. 114–119.

*J. Appl. Polym. Sci.*, 48, No. 9, pp. 1607–1609 (Jun. 5, 1993).

*Primary Examiner*—Jeffrey Snay
*Attorney, Agent, or Firm*—Edward McC. Roberts; R. Scott Meece; Michael U. Lee

[57] ABSTRACT

Methods of deblocking a polymeric article from a mold and/or removing undesirable materials from a polymeric article by applying supercritical fluids to the polymeric article. A preferred process is the treatment of ophthalmic lenses, such as contact lenses. Supercritical fluid, composed primarily of carbon dioxide, is applied to a contact lens affixed to a mold subsequent to the polymerization step. The application of supercritical fluid (SCF) causes the lens to efficiently and consistently separate from the mold, removes undesirable materials such as unreacted monomer, oligomers, or residual solvents from the lens core, and/or cleans the lens surface of adhered debris.

18 Claims, 2 Drawing Sheets

METHODS OF DEBLOCKING, EXTRACTING AND CLEANING POLYMERIC ARTICLES WITH SUPERCRITICAL FLUIDS

BACKGROUND OF THE INVENTION

1. Field of the Invention

This invention relates broadly to extraction and cleaning of polymeric articles and mold separation processes. More specifically, this invention relates to molded-lens extraction, cleaning and deblocking processes.

2. Description of the Related Art

The use of supercritical fluids (SCF) for cleaning and extracting in the food industry is well known (See *Chem. Engr.* Internat. Ed., vol. 100, no. 3, p. 114–9). For example, U.S. Pat. No. 3,806,619, issued Apr. 23, 1974 to Zosel, describes a process for decaffeinating coffee with supercritical fluids. Supercritical fluids have also been used to dry porous materials prepared in sol-gel processes. Supercritical fluid extraction of hydrophobic polymers, such as polypropylene, has also been explored (See *J. Appl. Polym. Sci.*, 48, no. 9, Jun. 5, 1993, p. 1607–9). Furthermore, porous sponges of biodegradable polymers have been formed by applying supercritical fluids in a manner requiring a sharp pressure drop (See PCT Int. Appl. No. WO 9109079, De Ponti). However, the efficient use of supercritical fluids requires high temperatures and pressures, which may damage certain polymeric materials.

Numerous polymeric articles are formed by placing a monomeric solution into a mold and then initiating polymerization. The efficient removal of molded articles from the mold represents a critical step in the design of a manufacturing process. After the polymeric article is separated from the mold, the article must typically be subjected to extraction processes to removed undesirable materials, such as unreacted or partially-reacted monomers (i.e., oligomers or short chain polymers) and residual solvent. An ophthalmic lens is an example of a polymeric article which may be molded in such a manner.

Ophthalmic lenses, such as contact lenses, are typically formed from hydrophilic monomers, in order to enhance biocompatibility with the eye. Contact lenses formed from hydrophilic polymers are desirable, in part, because hydrophilic contact lenses move well on the eye. This movement enhances tear flow and debris removal beneath the lens, thereby improving patient comfort.

One method of forming a contact lens involves lathing the lens from a preformed polymeric disc, a so-called lens "button". Another method of forming contact lenses, as previously-mentioned, involves placing a monomeric solution into a lens mold and polymerizing the monomer. Double-sided molding is an example of the second type of lens molding process which has been gaining in popularity in recent times.

In molding lenses, subsequent to polymerization, the lenses are typically "deblocked", i.e., separated from the mold, and subjected to extraction processes for a period of hours. The extraction processes remove unreacted monomer and partially-reacted oligomer, solvents or other undesirable materials. These commercial extraction processes typically involve contacting the lenses with organic solvents, such as isopropyl alcohol, to solvate the undesireables. Such wet extraction processes are time consuming and costly, produce a wet lens which is not suited to immediate surface treatment. Furthermore, these extraction processes yield an effluent stream of solvent and monomer which is not easily disposed of.

In addition, the step of deblocking the lens presents manufacturing problems. First, the deblocking must occur quickly and consistently, in order to maximize production efficiency. Second, the deblocking must be complete, i.e., even minor portions of the polymeric lens must not remain adhered to the mold. Incomplete blocking typically results in substantial volumes of production scrap because the lens is likely to tear when removed from the mold. Moreover, even slight lens surface imperfections, caused by the lens adhering to the mold during deblocking, translate into major visual distortions for the lens wearer.

Thus, there is a need for improvements in efficiency, safety, cost, and waste-minimization in polymeric-article (especially ophthalmic-device) extraction and cleaning processes. In addition, there is a need for an improved method of deblocking a polymeric article (especially an ophthalmic device) from a mold immediately subsequent to polymerization.

SUMMARY OF THE INVENTION

An object of the invention is to provide a method of extracting undesirable materials from a polymeric article and/or cleaning from the surface of a polymeric article any undesirable materials which have adhered to the surface without introducing excessive organic solvents.

Another object of the invention is to provide a method of quickly and efficiently deblocking a polymeric article from a mold subsequent to formation of the polymeric article by polymerization in the mold.

A further object of the invention is to provide a method for simultaneously removing undesirable materials from a polymeric article and deblocking a polymeric article from a mold.

Yet another object of this invention is to reduce production time required to process polymeric articles.

An additional object of the invention is to reduce production scrap in the production of polymeric articles.

Even another object of this invention is to reduce the amount of organic solvents required to produce polymeric articles.

One embodiment of the invention is a method of removing undesirable materials from hydrophilic polymeric articles. The method involves contacting the polymeric article with a supercritical fluid at conditions and for a time sufficient to remove undesirable materials from the polymeric article. The removal may involve extraction of undesirable materials from the polymeric core or cleaning of undesirable materials from the surface of the polymer. In a preferred embodiment, ophthalmic lenses are contacted with supercritical fluid, especially supercritical fluids containing carbon dioxide, to remove monomers, oligomers, and/or solvents remaining from the preceding lens-polymerization process.

Another embodiment is a method of deblocking polymeric articles from molds subsequent to polymerization processes. The method includes the step of contacting the polymeric article with a supercritical fluid at conditions and for a time sufficient to separate the polymeric article from the mold. A preferred embodiment is a method of deblocking ophthalmic lenses from molds subsequent to the lens-polymerization process by contacting the lens with a supercritical fluid, preferably one which includes carbon dioxide.

In yet another embodiment, a method of simultaneously removing undesirable materials from a polymeric article and deblocking a polymeric article from a mold is disclosed. The method includes a step of contacting the polymeric article with supercritical fluid at conditions and for a time sufficient to both remove certain undesirable materials from the polymeric article and separate the polymeric article from the mold.

DESCRIPTION OF THE PREFERRED EMBODIMENTS

Figure 1:
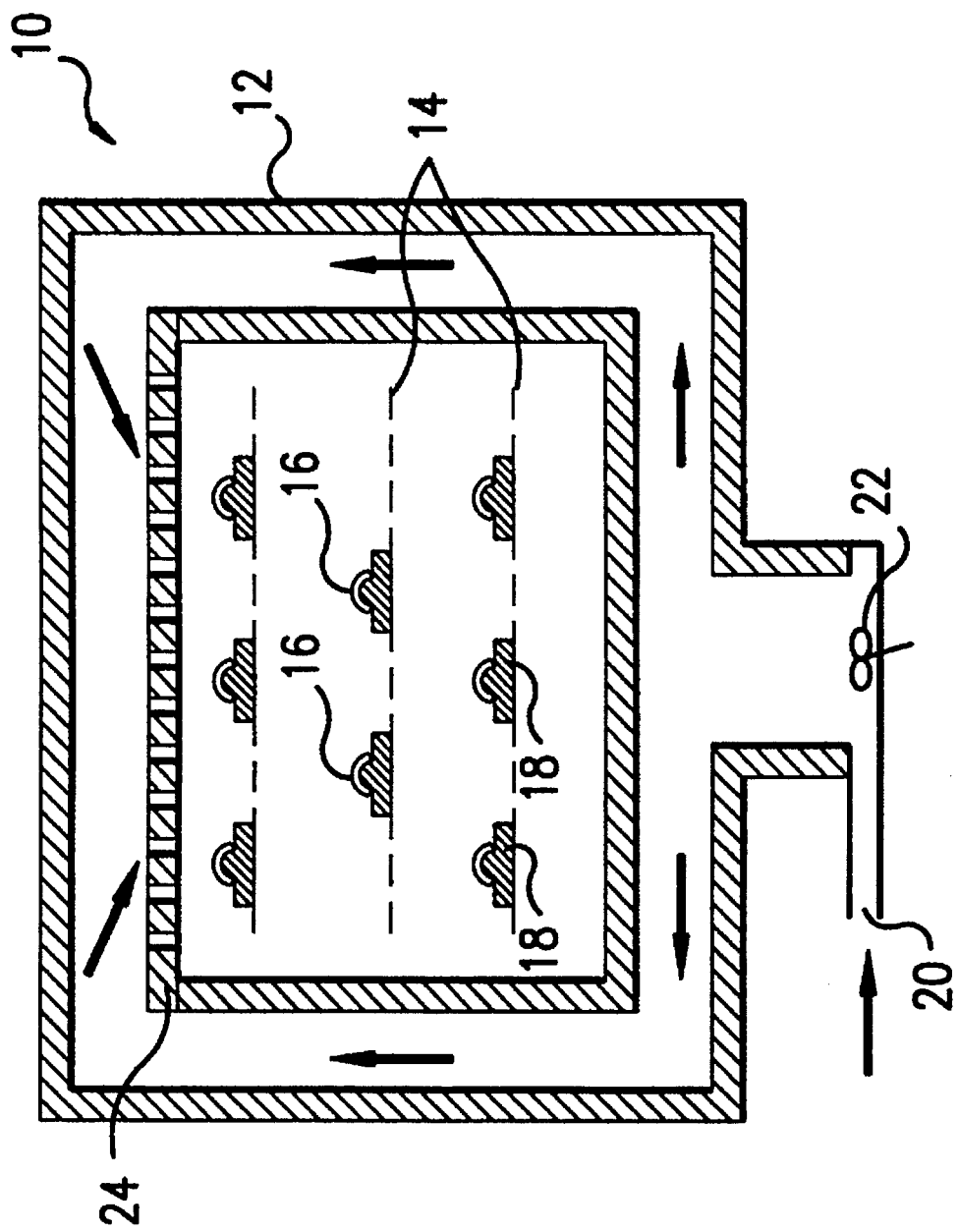
FIG. 1 is a side sectional view of a multicomponent, batch-process, supercritical-fluid treatment apparatus.

The present innovative methods of extracting undesirable materials from a polymeric article, deblocking a polymeric article from a mold, and/or cleaning undesirable materials from the surface of a polymeric article, involve the steps of:

(1) providing a stream of supercritical fluid at a predetermined temperature and pressure;

(2) contacting a polymeric article with the supercritical (or near-supercritical) fluid for a predetermined period of time;

(3) agitating the supercritical fluid in a manner such that at least one of the following occur: (a) the polymeric article is separated (deblocked) from the mold, (b) unreacted monomer, oligomer, and/or solvent is extracted from the polymeric article with the supercritical fluid, and/or (c) undesirable materials are removed from the surface of the polymeric article; and (4) removing the supercritical fluid, which may include unreacted monomer, oligomer, and/or solvent, from the polymeric article and mold.

A "supercritical fluid", as the term is used herein, means a substance at a temperature and pressure which places the substance in or near the supercritical regime. A temperature of at least about 20° C. and a pressure at least about 600 psia are believed to be sufficient to achieve the advantages of the present invention.

"Removing undesirable materials", as used herein, means either extracting undesirable materials from the polymeric core or cleaning undesirable materials from the surface of the polymeric article. Undesirable materials which may be extracted include monomers, partially-reacted oligomers, solvents, polymerization initiators, and the like. Undesirable materials which may be cleaned from the surface of the polymeric article include the aforementioned-undesirable materials, debris or surface contaminants, such as abrasives used in surface polishing processes, oils, and the like.

The advantages achieved by the practice of the present invention are numerous. First, polymeric articles which are treated with supercritical fluids (SCF) are essentially "dry", i.e. free of solvent after SCF treatment, while organic solvent extraction, cleaning or deblocking processes yield "wet" products, i.e., some solvent remains in or on the article. In order to further process a polymeric article which is "wet", the article must be dried over a period of time, and typically, at an elevated temperature. In contrast, polymeric articles which have been subjected to SCF treatment may be nearly immediately indexed or moved to the next processing step (e.g., a subsequent surface treatment process).

Another advantage of the present invention is that the use of flammable, potentially toxic, organic solvents is minimized or eliminated. Thus, the invention increases safety in the manufacturing environment and/or reduces costs associated with protecting workers from the hazards of organic solvents. On a similar note, the expenses and hazards associated with disposal of spent organic solvents is reduced or eliminated with the present invention.

The instant invention offers yet another advantage in improving extraction efficiency. Extraction of contact lenses with supercritical fluids in accordance with the instant teachings may yield monomer/oligomer concentrations less than about 2 weight percent in a 1.5 to 3 hour time period using a 95 weight percent isopropyl alcohol/5 weight percent carbon dioxide SCF mixture at about a one gallon per minute flow rate. In contrast, extraction of contact lenses with solvent typically yields monomer/oligomer concentrations at about 2% in a 24 hour time period. Thus, the present SCF extraction process yields the same quality product in a greatly reduced time frame.

While the amount of unreacted monomer/oligomer remaining in the finished polymeric article which can be tolerated depends on the intended application of the polymeric article, the specifications for medical devices, ophthalmic lenses and the like are typically quite stringent. Thus, the present invention is particularly suited to application in those areas which have restrictive regulatory requirements, especially in the ophthalmic lens industry.

Polymeric articles which may be treated with supercritical fluids in accordance with the present invention include a wide variety of polymeric articles which are formed by initiating polymerization of a monomeric mixture in a mold. Examples of such polymeric articles include, without limitation thereto, medical devices and components, such as drug delivery devices (transdermal, ophthalmic, parenteral, etc.) and components thereof; and, in particular, ophthalmic devices including vision correction devices, such as contact lenses, ocular implants, ocular onlays, and components thereof.

Polymers suited to the formation of polymeric articles which may be advantageously subjected to the presently described inventive processes include, without limitation thereto, hydrophobic polymers, such as polyethylene, polypropylene, poly(vinyl pyrrolidone) or polysiloxanes; hydrophilic polymers, such as poly(2-hydroxyethyl methacrylate), and poly(vinyl alcohol); biodegradable polymers such as polylactides, polyglycolides, and the like; and antimicrobial polymers such as polyquaternary ammonium compounds. Preferably, the SCF treatment processes of the present invention are applied to hydrophilic polymeric articles, capable of forming hydrogels when equilibrated with water (i.e., capable of absorbing about 10 weight percent water).

Furthermore, by applying the supercritical fluid immediately subsequent to substantial completion of the polymerization reaction, i.e., while the polymeric article is still in the mold, one obtains a remarkable advantage in deblocking the article from the mold. Thus, application of SCF's at a time immediately subsequent to polymerization completion can simultaneously deblock the article from the mold and extract undesirable unreacted monomers, partially-reacted oligomers, solvents or other additives. This remarkable discovery provides the aforementioned advantages regarding solvent reduction or elimination, while simultaneously eliminating the need for additional equipment or materials to separate the polymeric article from the mold.

In the production of contact lenses, the present invention displays particularly remarkable advantages. Contact lenses which are molded in a double-sided molding process are typically molded in a hydrophobic polymer mold. A monomeric mixture, which commonly includes 2-hydroxyethyl methacrylate for hydrophilic "soft" contact lenses, is introduced into the mold. The mold containing the monomer may be irradiated to initiate polymerization. Once the lens has been formed, i.e., polymerization is substantially complete, the lens must be removed, i.e., deblocked, from the mold. At times, lenses are scrapped because of damage caused during deblocking steps, since the adhesion of the lens to the mold impairs the deblocking process. In addition, unreacted monomer and oligomers are undesirable materials which must be removed from the lens. Removal of undesirable materials may involve numerous subsequent processing steps, including solvent extraction and heat treating over extended time periods. Thus, many commercial contact lens production processes include numerous processing steps relating to extraction and deblocking.

However, in accordance with one embodiment of the present invention, a simultaneous extraction and deblocking step may be substituted for the prior art sequential extraction and deblocking steps. It has been unexpectedly found that the application of supercritical fluid to a contact lens in a mold for extraction purposes causes the lens to detach from the mold. This reduction in the attractive forces between the lens and the mold enables a quick removal of the lens from the mold, while minimizing the likelihood of lens damage and concomitant scrap formation.

The supercritical substance may be selected from a wide variety of substances which are gases or liquids at room temperature and pressure, including without limitation thereto, carbon dioxide; water; alcohols, especially low molecular weight alcohols such as isopropyl alcohol and ethanol; ammonia; ethylene; carbon disulfide; sulfurhexafluoride; hexane; acetone; and other common organic solvents, and mixtures thereof. A preferred group of SCF's includes alcohols such as isopropyl alcohol and relatively inert, innocuous gases or fluids such as carbon dioxide or water. Carbon dioxide and isopropyl alcohol are more preferred.

While the conditions of the substance used as the supercritical fluid may vary somewhat, the substance must be at a temperature and pressure which places the substance in or near the supercritical region. The temperature and pressure of the supercritical fluid depend on the chosen fluid composition. For carbon dioxide, the temperature and pressure for producing a supercritical fluid are above about 1085 psi and about 31° C. A temperature range of 21° to 45° C. and pressure range of 600 to 5000 psia are believed useful for a carbon dioxide stream. Preferably, the carbon dioxide stream is maintained at a temperature of about 21° to 35° C. and a pressure of about 900 to 3000 psia.

Particularly preferred mixtures of fluids useful in extracting and deblocking contact lenses include carbon dioxide and isopropyl alcohol (IPA). A preferred composition of the fluid includes about 70 to about 99 weight percent carbon dioxide and about 1 to about 30 weight percent isopropyl alcohol. A more preferred fluid composition includes about 75 to about 85 weight percent carbon dioxide and about 15 to about 25 weight percent isopropyl alcohol.

In order to properly extract undesirable materials from a contact lens within a lens mold, the supercritical fluid should be properly agitated. Sufficient agitation of the supercritical fluid may occur by merely contacting a stream of supercritical fluid with the polymeric article to be treated. However, a preferred flow regime is in the turbulent range, i.e., fluid flows having Reynold's numbers above 2100.

Supercritical fluid extraction equipment may be procured commercially from a variety of sources, including Pressure Products Industries, Inc. (Warminster, Pa.) and Autoclave Engineering (Erie, Pa.). A preferred SCF extractor for opthalmic devices, such as contact lenses, is the EP Model 12-3000, available from Autoclave Engineering.

In a preferred embodiment, the invention is a method for treating an ophthlamic lens subsequent to the polymerization of the lens. This embodiment of the invention is discussed with respect to a particularly preferred embodiment—the treatment of a contact lens. However, this embodiment of the invention is not limited to contact lenses, but includes intraocular lenses, drug delivery lenses, corneal onlays, etc.

If the lens is fabricated by a double-sided molding process, one half of the mold is separated from the lens prior to application of supercritical fluid. Typically, the lens remains removably affixed to the base mold half (convex mold half), leaving the front or convex lens surface exposed. The lens mold may be treated in order to render one mold half more adherent and/or the other mold half less adherent, in order to ensure consistent location of the lens on the desired mold half. Alternatively, sensing equipment may be used to determine the mold half to which the lens is removably-affixed, so that the lens-containing mold half is treated with the supercritical fluid. Regardless of the technique chosen, the lens-retaining mold half is treated with supercritical fluid subsequent to the first mold half separation step.

Treatment of the lens on the mold half with supercritical fluid is preferably accomplished in a batch process to ensure thorough contact with the fluid and to ensure the fluid remains or cycles through the supercritical temperature and pressure ranges. In order to increase processing efficiencies, a plurality of lenses may be treated in one batch process. FIG. 1 schematically illustrates an apparatus capable of batch treating a plurality of lenses.

Referring to FIG. 1, lens-treating apparatus 10 is surrounded with insulation 12 sufficient to maintain the applied fluid at the desired supercritical temperature and pressure ranges. Trays 14 support a plurality of lenses 16 affixed to molds 18. The support trays either have perforations or are sufficiently porous to allow supercritical fluid to flow through the trays.

In operation, the trays are loaded into lens treating apparatus 10, either manually or via an automated lens distribution system, through an access opening (not shown), with the access opening being sealed subsequent to the loading step. Supercritical fluid, entering through inlet 20 at a rate of about 0.1 to 5 gallons per minute, is distributed uniformly to passageways positioned along the walls of the container by agitation means 22. At a point near the top of apparatus 10, supercritical fluid passes through a flow distribution member 24, which provides uniform supercritical fluid flow across a cross-section of the apparatus perpendicular to the flow. The supercritical fluid flows through trays 14, contacting lenses 16 and molds 18, preferably in a turbulent fashion, before exiting through the fluid outlet (not shown).

Figure 2:
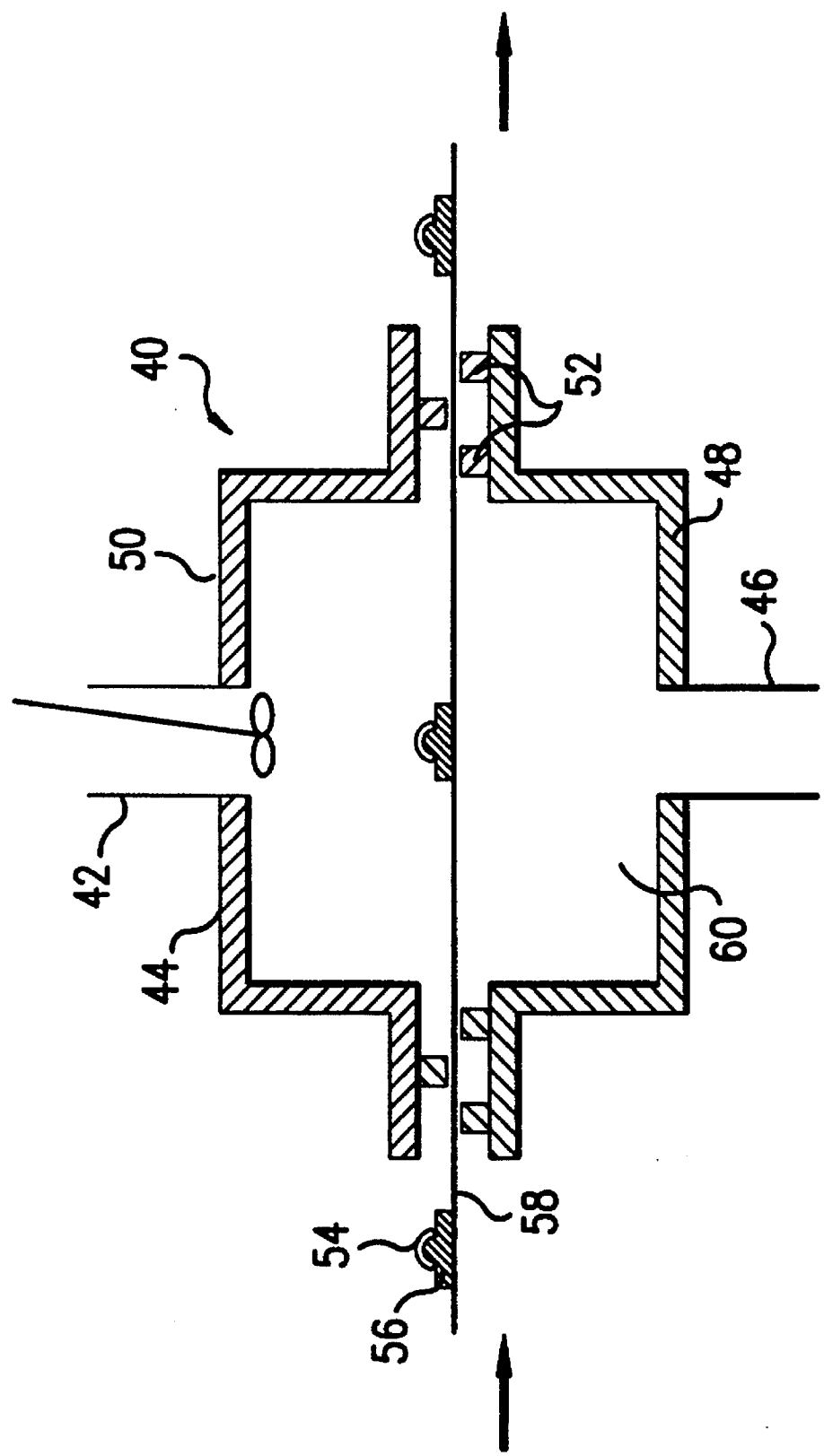
FIG. 2 is a side sectional view of an in-line, supercritical-fluid treatment apparatus.

An alternative lens treating apparatus 40 is illustrated in FIG. 2. Apparatus 40, shown in closed configuration, includes inlet 42 on upper portion 44 and outlet 46 on lower portion 48. Apparatus 40 further includes agitation means 50 and peripheral sealing means 52. The sealing of upper portion 44 to lower portion 48, via peripheral sealing means 52, defines lens treating cavity 60.

In operation, upper and lower portions 44 and 48 are vertically separated to allow lens 54 affixed to mold 56 to index on conveyor 58 to a position between the upper and lower portions. After a lens-containing mold is indexed to the desired position intermediate upper and lower portions 44 and 48, the upper and lower portions are mated, thereby forming a liquid impermeable seal defined by peripheral sealing means 52. Supercritical fluid flows through inlet 42 and is dispersed by agitating means 50, thereby contacting the lens in a turbulent fashion. Spent supercritical fluid exits through outlet 46 and the upper and lower portions 44 and 48 are separated to allow the treated lens-containing mold to index out and the process to begin again.

While the step of agitating the supercritical fluid is desirable, it is not a required step. In a preferred embodiment, agitation is provided by mechanical means, as shown in FIGS. 1 and 2. However, a preferred agitation state may arise merely from the application of the supercritical fluid at the appropriate pressure, i.e., a turbulent flow is developed by the passageway dimensions, passageway shape, and fluid pressure.

FIGS. 1 and 2 present two designs for equipment suited to treating lenses with supercritical fluids. However, a wide variety of alternatives will be readily apparent to persons having ordinary skill in the art, given the teachings of the present invention. Accordingly, the invention should not be strictly constrained to the designs presented in FIGS. 1 and 2.

The previous disclosure will enable one having ordinary skill in the art to practice the invention. In order to better enable the reader to understand specific embodiments and the advantages thereof, reference to the following examples is suggested.

EXAMPLE I

Hydrophilic contact lens are formed in a double-sided molding process. The concave mold halves are manually removed, leaving the lenses predominately affixed to the convex mold halves. The lenses and affixed convex mold halves are placed inside the treatment cavity of an Autoclave Engineering model EP-2000 Supercritical $CO_2$ Treatment System. Supercritical carbon dioxide fluid at 3000 psig and 35° C. is applied to the lenses and affixed mold halves for a period of about 100 minutes. The lenses affixed to the base-curve mold halves are not deblocked from the mold halves.

EXAMPLE II

Hydrophilic contact lenses and affixed mold halves are treated as described in Example I, with the SCF pressure at 3000 psig and temperature at 30° C. The treatment period is about 100 minutes. The lenses affixed to the base-curve mold halves are not deblocked from the mold halves.

EXAMPLE III

Hydrophilic contact lenses and affixed mold halves are treated as described in Example I, with the SCF pressure at 3000 psig and temperature at 25° C. The treatment period is about 100 minutes. The lenses are partially, but incompletely, deblocked from the base-curve mold halves.

EXAMPLE IV

Hydrophilic contact lenses and affixed mold halves are treated as described in Example I, with the near-supercritical fluid pressure at 1000 psig and temperature at 25° C. The treatment period is about 100 minutes. The lenses are partially, but incompletely, deblocked from the base-curve mold halves.

EXAMPLE V

Hydrophilic contact lenses and affixed mold halves are treated as described in Example I, but a 19 weight percent isopropyl alcohol (IPA)/81 weight percent carbon dioxide mixture is used, instead of the 100% carbon dioxide of Example I. The pressure is 3000 psig while the temperature was 30° C. The treatment period is about 97 minutes. The lenses are deblocked from the base-curve mold halves.

EXAMPLE VI

Hydrophilic contact lenses and affixed mold halves are treated as described in Example I, but a 14 weight percent isopropyl alcohol/86 weight percent carbon dioxide mixture is used, instead of the 100% carbon dioxide of Example I. The pressure is pulsed while the temperature is held at about 30° C. The pressure cycle includes about a 10 minute period at 3000 psig followed by a pressure drop to about 1000 psig, then a return to the 3000 psig pressure. The treatment period is about 81 minutes. The lenses are deblocked from the base-curve mold halves.

EXAMPLE VII

Hydrophilic contact lenses and affixed mold halves are treated as described in Example I, but a 10 weight percent isopropyl alcohol/90 weight percent carbon dioxide SCF mixture is used, instead of the 100% carbon dioxide of Example I. The pressure is 3000 psig while the temperature is 30° C. The treatment period is about 100 minutes. The lenses are deblocked from the mold halves. The average weight percent extractables in the lenses is about 1.6.

COMPARATIVE EXAMPLE VIII

Hydrophilic contact lenses are deblocked from molds. The lenses are immersed for about 15 hours in isopropyl alcohol. The spent alcohol is replaced with fresh alcohol, and the lenses are allowed to soak again for about 8 hours. The average weight percent extractables in the lenses is about 1.1. Results are shown in Table I for comparison with Example VII.

TABLE 1

| Example | Pressure (psig) | Temperature (C.) | Exposure Time (minutes) | Composition (weight percent) | Results |
| --- | --- | --- | --- | --- | --- |
| I | 3000 | 35 | 100 | 100% $CO_2$ | no deblocking from base-curves |
| II | 3000 | 30 | 100 | 100% $CO_2$ | no deblocking from base-curves |

TABLE 1-continued

| Example | Pressure (psig) | Temperature (C.) | Exposure Time (minutes) | Composition (weight percent) | Results |
|---|---|---|---|---|---|
| III | 3000 | 25 | 100 | 100% $CO_2$ | incomplete deblocking from base-curves |
| IV | 1000 | 25 | 100 | 100% $CO_2$ | incomplete deblocking from base-curves |
| V | 3000 | 30 | 97 | 81% $CO_2$ 19% IPA | complete deblocking from base-curves |
| VI | pulsed at 3000 and 1000 | 30 | 81 | 86% $CO_2$ 14% IPA | complete deblocking from base-curves negligible extractables |
| VII | 3000 | 30 | 100 | 90% $CO_2$ 10% IPA | incomplete deblocking from base-curves; 1.6% extractables |
| VIII (control) | about 14.7 | about 21 | 1380 | 100% IPA | 1.1% extractables |

In all Examples, the lenses which are affixed to the front-curve mold halves are deblocked. Variations in deblocking occur only in lenses affixed to the base-curve mold halves.

Examples V and VI illustrate that contact lenses may be deblocked from lens molds subsequent to polymerization steps by application of supercritical carbon dioxide/isopropyl alcohol fluids. Deblocking problems in Examples I–VI are believed to be a result of non-optimized conditions and/or fixturing problems, i.e., improper location of the lenses and mold halves within the SCF treatment cavity.

Further, a comparison of Examples VII to Comparative Example VIII shows that extraction of lenses with supercritical fluids produces extractable levels comparable to extraction by batch soaking in isopropyl alcohol, but over a significantly reduced time period.

The invention has been described in detail, with reference to certain preferred embodiments, in order to enable the reader to practice the invention without undue experimentation. However, a person having ordinary skill in the art will readily recognize that many of the previous components and parameters may be varied or modified to a certain extent without departing from the scope and spirit of the invention. Furthermore, titles, headings, or the like are provided to enhance the reader's comprehension of this document, and should not be read as limiting the scope of the present invention. Accordingly, the intellectual property rights to this invention are defined only by the following claims and any reasonable extensions thereof.

That which is claimed is:

1. A method of deblocking polymeric articles from molds, comprising the steps of:
   (1) providing a stream of supercritical fluid at a predetermined temperature and a predetermined pressure;
   (2) contacting a hydrophilic polymeric article with the supercritical fluid for a predetermined period of time in a manner such that the polymeric article is detached from a mold, wherein the contacting step is conducted without an extraneous agitation or with a mechanical agitation; and
   (3) removing the supercritical fluid from the polymeric article.

2. A method of claim 1, further comprising the step of mechanically agitating the supercritical fluid.

3. A method of claim 1, wherein said supercritical fluid stream is provided in a turbulent flow regime.

4. A method of claim 1, wherein the flow rate of said supercritical fluid stream is between 0.1 and 5 gallons per minute.

5. A method of claim 1, further comprising the step of mechanically agitating the supercritical fluid to produce a turbulent flow regime,
   wherein said supercritical fluid comprises 70 to 99 weight percent carbon dioxide and 1 to 30 weight percent isopropyl alcohol,
   wherein the flow rate of said supercritical fluid stream is between 0.1 and 5 gallons per minute, and
   wherein said polymeric article is an ophthalmic device.

6. A method of claim 1, wherein the polymeric article is simultaneously deblocked from the mold while undesirable materials are removed with the supercritical fluid.

7. A method of claim 6, wherein said removing involves extracting unreacted monomer, oligomer, and/or solvent from the core of the polymeric article.

8. A method of claim 6, wherein said removing involves cleaning undesirable materials from the surface fo the polymeric article.

9. A method of claim 1, wherein said pressure is between 600 and 5000 psia and said temperature is between 21° and 45° C.

10. A method of claim 9, wherein said pressure is between 900 and 3000 psia and said temperature is between 21° and 35° C.

11. A method of claim 1, wherein said polymeric article is selected from the group consisting of medical devices.

12. A method of claim 11, wherein said polymeric article is an ophthalmic device.

13. A method of claim 12, wherein said polymeric article is a contact lens.

14. A method of claim 1, wherein said supercritical fluid is selected from the group consisting of carbon dioxide, alcohols, hexane, acetone, sulfur hexafluoride, and mixtures thereof.

15. A method of claim 14, wherein said supercritical fluid is selected from the group consisting of carbon dioxide, isopropyl alcohol, and mixtures thereof.

16. A method of claim 15, wherein said supercritical fluid is carbon dioxide.

17. A method of claim 15, wherein said supercritical fluid comprises:
(a) 70 to 99 weight percent carbon dioxide; and
(b) 1 to 30 weight percent isopropyl alcohol.

18. A method of claim 17, wherein said supercritical fluid comprises:
(a) 75 to 85 weight percent carbon dioxide; and
(b) 15 to 25 weight percent isopropyl alcohol.

* * * * *